United States Patent [19]
Dixon et al.

[11] Patent Number: 5,308,499
[45] Date of Patent: May 3, 1994

[54] EFFLUENT TREATMENT

[75] Inventors: David R. Dixon, Blackburn; Tiong C. Ha, East Kew, both of Australia

[73] Assignee: Commonwealth Scientific and Industrial Research Organisation, Australian Capital Territory, Australia

[21] Appl. No.: 773,943

[22] PCT Filed: May 22, 1991

[86] PCT No.: PCT/AU90/00213

§ 371 Date: Jan. 7, 1992

§ 102(e) Date: Jan. 7, 1992

[87] PCT Pub. No.: WO90/14310

PCT Pub. Date: Nov. 29, 1990

[30] Foreign Application Priority Data

May 22, 1989 [AU] Australia .......................... PJ4312/89

[51] Int. Cl.$^5$ .............................................. B03D 1/02
[52] U.S. Cl. ...................................... 210/705; 210/727
[58] Field of Search ............... 210/703, 704, 705, 723, 210/726, 727, 731–734

[56] References Cited

U.S. PATENT DOCUMENTS

| | | | |
|---|---|---|---|
| 3,677,940 | 7/1972 | Fujimoto et al. | 210/705 |
| 3,959,131 | 5/1976 | Ramirez et al. | 210/707 |
| 4,005,009 | 1/1977 | Kinoshita et al. | 210/705 |
| 4,744,904 | 5/1988 | McAninch et al. | 210/705 |
| 4,783,263 | 11/1988 | Trost et al. | 210/705 |
| 4,948,512 | 8/1990 | Gotlieb et al. | 210/705 |
| 5,009,792 | 4/1991 | Pettersen et al. | 210/705 |

*Primary Examiner*—Neil McCarthy
*Attorney, Agent, or Firm*—Sughrue, Mion, Zinn, Macpeak & Seas

[57] ABSTRACT

An effluent treatment process having the steps of: a) adding a coagulant to the effluent to concentrate the organic material therein; b) treating the thus concentrated organic material with a mixture of a cationic polymer of copolymer in the presence of an anionic surfactant, a nonionic surfactant or both; and c) separating the organic material from the effluent by flotation.

8 Claims, No Drawings

EFFLUENT TREATMENT

This invention relates to a new effluent treatment process. More specifically, the invention is concerned with the separation of the organic material in aqueous industrial effluents by flotation to leave a treated liquid effluent, and a concentrated sludge containing the unwanted contaminants.

Aqueous industrial effluents containing high concentrations of organic compounds include sewage effluents, paper and pulp mill effluents, leachates from chemical waste land fills, wool scour effluents and effluents from water clarification processes such as the "Sirofloc" process which is described in Australian Patent No. 512,553. The disposal of these effluents usually involves direct discharge to a water course, sewer or land. However, environmental considerations now demand some form of additional treatment to remove the pollutants.

The success of any effluent treatment process will be based on concentration, that is, the extent to which the contaminants are separated into a low volume phase ("sludge") thereby recovering as much of the water as possible. The quality of the recovered water should be at least sufficient to recirculate this as feedwater. Disposal of the relatively small volume of sludge can then be achieved more easily and cheaply.

A wide range of possible treatment methods are conventionally considered. These include removal techniques such as coagulation, precipitation, adsorption and filtration, as well as destructive techniques such as oxidation and biological processes. Commonly economic evaluation of the most promising options determined that treatment with alum or ferric coagulants was likely to be the cheapest method.

Foam separation techniques have been used for many years to remove traces of heavy metal ions from industrial effluents. Adsorbing colloid flotation has now been developed and involves the addition of a high surface area solid onto which the heavy metal ions can adsorb. The loaded substrate is then removed by addition of a surfactant and the injection of a gas, usually air. The substrate is usually aluminium or ferric hydroxide which is generated in-situ and the surfactant employed is anionic. The technique has been applied to a wide range of waters and wastewaters with a variety of metal ions.

The techniques of pressure flotation or dissolved air flotation (DAF) is commonly used in water purification. The lack of industrial acceptance of this technique is probably due to economic factors related to the high operating costs of the DAF plants. However, the potential value of DAF for potable water treatment, particularly for raw waters with high algal populations, is now recognised and indications are that it is competitive with conventional sedimentation processes.

For sewage effluents, the activated sludge process is widely used to reduce biochemical oxygen demand (BOD), but requires long residence times and large plants with high capital and operating costs. Biological methods such as the activated sludge process have long been favoured over physico-chemical methods for economic reasons. However, a variation of the "Sirofloc" process for water clarification has been shown to satisfactorily treat such effluents with the promise of smaller, cheaper plants. This process which is described in Australian Patent Specification No. 79700/87 uses magnetite to rapidly clarify the sewage effluent with the production of a sewage concentrate some 30 to 40 times more concentrated than the original.

Despite interest in the use of flotation in the treatment of sewage and sewage effluents, the technique is primarily used in the thickening of excess activated sludge as a means of assisting overloaded plants.

The use of metallurgical flotation techniques in the recovery of wool grease from wool scour effluents has also been described in L. F. Evans and W. E. Ewers, *Australian Journal of Applied Science*, Vol 4, 552–58 (1953).

We have now found that the combination of a coagulant and a mixture of a cationic polymer or copolymer with an anionic surfactant, a non-ionic surfactant or both can be used to concentrate and separate the organic material present in effluents using the technique of flotation. This process is economically viable due to its fast rate of separation and small sludge volume, which reduces the capital, operating and disposal costs.

According to the present invention there is provided an effluent treatment process which comprises the steps of:
(a) adding a coagulant to the effluent to concentrate the organic material therein;
(b) treating the thus concentrated organic material with a mixture of a cationic polymer or copolymer in the presence of an anionic surfactant, a nonionic surfactant or both; and
(c) separating the organic material from the effluent by flotation.

Coagulants suitable for use in the process of the invention are inorganic coagulants such as alum, lime magnesium salts or ferric salts, for example, ferric chloride.

Process conditions, such as pH may need to be adjusted to allow for generation of the flocs. It will be understood that the process conditions will vary with the composition of the effluent treated. Optimum conditions will therefore need to be determined by experiment.

Some effluents which may be treated in accordance with the process of this invention may already contain a sufficient quantity of a surfactant (anionic and/or non-ionic) to fulfil the requirements of the process. Otherwise, the required surfactant may be added to the effluent undergoing treatment.

In one embodiment of the present invention, a mixture of a cationic polymer of copolymer and an anionic surfactant may be added to the effluent. The cationic polymer or copolymer functions to reverse the charge on the floc and thereby allow the anionic surfactant to adsorb onto the floc in a suitable configuration for subsequent flotation.

Suitable cationic polymers or copolymers include Poly(diallyl dimethylammonium chloride) (e.g. Catfloc T), polyethyleneimine, polyvinylamine, acrylamide copolymers, acrylic copolymers containing quaternary ammonium groups, poly(vinyl 4-alkylpyridinium) salts, poly(methylene-N,N-dimethylpiperidinium) salts, poly(vinylbenzyltrimethylammonium) salts, polyalkylene polyamines, (e.g. polyethyleneamine), poly(hydroxyalkylene polyamines) and cationic starch.

Suitable anionic surfactants may be selected from carboxylates, sulphonates, sulphates or phosphates. More preferably, the anionic surfactants include polyalkoxycarboxylates, N-acylsarcosinates (e.g. Sandopan MS-40 Registered Trademark), acylated protrein hydrolysates (e.g. Maypon K), sulphonates (e.g. Hostapur SAS 60), alkylbenzenesulphonates (e.g. SDS), alkylarylenesulphonates, lignosulphonates, naphthalene sulphonates (e.g. Aerosol OS), α-olefin sulphonates (e.g. Boioterg AS40), petroleum sulphonates, Dialkylsulphosucciantes (e.g. Aerosol TO), amidisulphonates (e.g. Igepon TC42), alkyl sulphates, (e.g. Avirol SG100), ethoxylated and sulphated alcohols, ethoxylated and sulphated alkylphenols (e.g. ICI Alkanate 3SL3 or 3SN5), sulphated acids, amides or esters (e.g. Triton X-301), sulphated natural oils or fats, phosphate esters (e.g. decyl phosphate). It will be appreciated that the ultimate choice of surfactant will be a compromise between efficiency (as determined by froth concentration, volume, ease of collapsing), toxicity and cost.

In a further embodiment of the present invention, a nonionic surfactant may be employed together with or instead of the anionic surfactant. Preferred nonionic surfactants include ethoxylates, such as octyl phenol ethoxylates, for example Teric X11 (Registered Trademark), nonyl phenol ethoxylates, for example Teric N20 (Registered Trademark), fatty alcohol ethoxylates, for example Teric 12A9 (Registered Trademark) and fatty amine ethoxylates, for example Teric 18M2 (Registered Trademark).

The term "flotation" as used herein refers to the technique in which air is passed through the effluent mixture and air bubbles becomes attached to surfactant—treated, flocculated organic material which then rises to the surface of the effluent water.

this technique results in rapid transport of the flocs to the effluent surface as a froth which, after collapsing, can be easily filtered to yield a filtrate with a small volume of sludge for disposal. In general, greater than 90% concentration of organics can be achieved after 10 minutes of flotation.

The ultimate fractions from the process of the invention expressed as a percentage of the effluent volume are a clear product water 97%, froth filtrate 2 to 3% and sludge less than 1%.

The clear product water is suitable for discharge or reuse. The small volume of sludge produced may be disposed of by land fill. Some of the coagulant and surfactant may be retrieved from the sludge for reuse.

Examples of the use of the process of the invention are given in the descriptions which follow. It will be understood, however, that the invention is not limited by these examples.

The following abbreviations are used:
TOC—total organic carbon
PCU—platinum-cobalt units
NTU—nephelometric turbidity units
CTAB—cetyl trimethylammonium bromide
c—colour
t—time
HLB—hydrophilic—lipophilic balance The regeneration effluents used in Examples 1 to 5 were obtained from the Bell Bay water treatment plant, Tasmania. The chemicals added as coagulants were AR grade alum and ferric chloride with the exception that in some experiments, a commercial product "Fericlear" from Tioxide Limited was used as a source of ferric sulphate. The surfactants and coagulants were all of commercial origin and will be described further in the examples.

The flotation vessel was a Hallimond tube with a cell volume of approximately 100 ml, fashioned from a mercury filter of high porosity. The air was controlled to a rate of 250 ml/min. The froth was allowed to overflow a lip in the cell and collected for analysis. In Examples 5 and 8 the experiments were scaled up using a Denver flotation cell of the type used in mineral beneficiation.

EXAMPLE 1

A volume of effluent was placed in the Hallimond tube apparatus with air flow, followed by the addition of a coagulant, pH adjustment and then the addition of a cationic polymer or copolymer and a surfactant. The duration of the experiment was one of the variables examined but rarely exceeded ten minutes, by which time either little froth remained or what froth remained was white in colour (in the earlier stages the froth was discoloured). The froth generated was collected, allowed to collapse (over 30 minutes), filtered and the filtrate analysed for colour, TOC, metal ion concentration and volume.

EXAMPLE 2

Cationic polymers or copolymers and anionic surfactants

The tests were carried out using a Bell Bay (2) effluent sample of the following composition:
Colour = 1250 PCU
Ph = 11.3
TOC = 106.1 mg/l.
together with the anionic surfactant sodium dodecyl sulphate (SDS). The results are shown in Table 1.

TABLE 1

| | EXPERIMENTAL CONDITIONS | | | PRODUCT WATER QUALITY |
|---|---|---|---|---|
| NO. | pH | [Fe] (mg/l) | [PE] (mg/l) | [SDS] (mg/l) | COLOUR (PCU) |
| 1 (a) | 4.50 | 100 | 0 | 20.0 | 196 |
| 2 (b) | 4.56 | 100 | 4.0 | 20.0 | 173 |
| 2 (c) | 4.53 | 100 | 4.5 | 20.0 | 17 |
| 2 (d) | 4.51 | 100 | 5.0 | 20.0 | 19 |
| 2 (e) | 4.50 | 50 | 5.0 | 20.0 | 17 |

TABLE 2

| | EXPERIMENTAL CONDITIONS | | PRODUCT WATER QUALITY | | | | FROTH FRACTION | | | |
|---|---|---|---|---|---|---|---|---|---|---|
| NO | [FE] | PE NAME [] | SURF. NAME [] | COL. (PCU) | TOC | [Fe] | VOL. (ml) | COL. (PCU) | TOC | [Fe] |
| 3 (i) | 100 | CAT T 5 | SDS 20 | 25 | 5.0 | 0.33 | 9 | 24 | 63.3 | 29 |
| 3 (ii) | 100 | 5 | 20 | 24 | 0.8 | 0.22 | 7 | | | |
| 3 (iii) | 100 | 5 | 20 | 28 | 2.9 | 0.28 | 4 | | | |
| 3 (iv) | 100 | 5 | 20 | 25 | 2.2 | 0.32 | 5 | | | |

Further tests under similar conditions were carried out with more comprehensive analyses of both the product water quality and the froth fraction. The results are shown in Table 2.

Table 2 demonstrates that if sufficient cationic polymer (Catfloc T) is added to reverse the charge then an anionic surfactant at low concentration will suffice. The process is still Ph sensitive but takes less than three minutes and produces a much smaller volume of froth which collapses immediately and can be rapidly filtered. Calculations of mass balances show that the sludge contains 80% of the colour, 25% of the TOC and 75% of the iron which indicates that further improvements is possible.

EXAMPLE 3

Cationic polymers or copolymers and anionic surfactants

In these tests the Bell Bay (2) effluent sample described in Example 2 was used and the pH was kept constant at approximately 4.5. The coagulant dose, the type and dose of polymer or copolymer and the type and dose of surfactant used were varied. The results are shown in Table 3.

As a consequence of the results shown in Table 3, the operating conditions were chosen to allow [Fe]=100 mg/l and [Catfloc T]=5.0 mg/l. Higher coagulant doses achieved greater clarification and froths of smaller volume but at higher costs. The other cationic polymer used was less effective, probably due to its higher molecular weight. The anionic surfactant did not function and too high a concentration of Catfloc T was also counterproductive with some flocs remaining in the product water unfloated.

Colour=940 CPU
TOC=106.1 mg/l
Turbidity=28.5 NTU.

The flotation regimes of Examples 2 to 3 were used i.e. the cationic polymer Catfloc T and the anionic surfactant SDS. The conditions for each test are shown in Table 4 and the results are shown in Table 5.

In the final test of Table 4, a period of 30 minutes was allowed between the addition of the coagulant and the cationic polymer or copolymer.

From Table 5 it can be seen that the effect of surfactant concentration (SDS) is readily apparent from the trends in product water turbidity and froth volume. Excess SDS caused too much froth to be collected too quickly, leaving many flocs and a lot of surfactant in the cell. In contrast to the earlier tests only one tray was needed for froth collection emphasizing that the foam does collapse more readily.

TABLE 4

| | | EXPERIMENTAL CONDITIONS | | | | |
|---|---|---|---|---|---|---|
| | | TIME | [Fe] | [PE] | [SURFACTANT] | |
| No. | pH | (mins) | (mg/l) | (mg/l) | NAME | (mg/l) |
| 4 (a) | 4.54 | 5 | 100 | 5.0 | SDS | 10 |
| 4 (b) | 4.45 | 5 | 100 | 5.0 | SDS | 15 |
| 4 (c) | 4.56 | 5 | 100 | 5.0 | SDS | 20 |
| 4 (d) | 4.51 | 5 | 100 | 5.0 | SDS | 30 |
| 4 (e) | 4.47 | 30 + 5 | 100 | 5.0 | SDS | 20 |

TABLE 5

| | PRODUCT WATER QUALITY | | | | FROTH FRACTION | | | | |
|---|---|---|---|---|---|---|---|---|---|
| NO | COLOUR (PCU) | TOC (mg/l) | TURBIDITY (NTU) | [Fe] (mg/l) | VOL. (ml) | COLOUR (PCU) | TOC (mg/l) | TURB. (NTU) | [Fe] (mg/l) |
| 4 (a) | 9 | 16.0 | 56.5 | 0.50 | 65 | 22 | 45.0 | 120 | 3.90 |
| 4 (b) | 9 | 18.7 | 40.3 | 1.04 | 90 | 7 | 18.8 | 56 | 0.74 |
| 4 (c) | 8 | 17.8 | 19.2 | 0.64 | 170 | 20 | 45.3 | 199 | 1.63 |
| 4 (d) | 11 | 47.0 | 812 | 2.50 | 200 | 32 | 48.7 | 152 | 1.63 |
| 4 (e) | 8 | 23.0 | 16.2 | 1.03 | 185 | 16 | 39.2 | 148 | 1.43 |

TABLE 3

| EXPERIMENTAL CONDITIONS | | | PRODUCT WATER | FROTH FRACTION | |
|---|---|---|---|---|---|
| [Fe] (mg/l) | PE (mg/l) | SURFACTANT (mg/l) | COLOUR (PCU) | VOL. (ml) | APPEARANCE |
| 50 | 5 CAT T | 20 | 76 | 18 | |
| 80 | 5 | 20 | 44 | 8 | |
| 150 | 5 | 20 | 39 | 5 | |
| 100 | 5 LT 25 | 20 | | | NO EFFECTIVE FLOTATION |
| 100 | 2 | 20 | | | NO EFFECTIVE FLOTATION |
| 100 | 1 | 20 | | | NO EFFECTIVE FLOTATION |
| 100 | 5 CAT T | 20 | 46 | | |
| 100 | 6 | 20 | 46 | | FLOCS IN PRODUCT WATER |
| 100 | 8 | 20 | 45 | | FLOCS IN PRODUCT WATER |
| 100 | 2 LT 31 | 20 | 19 | | FLOCS IN PRODUCT WATER |
| 100 | 0.5 | 20 | 27 | | FLOCS IN PRODUCT WATER |

EXAMPLE 4

Flotation cell tests on a larger scale

More tests were carried out on a 1 liter scale using the Denver flotation cell to treat a Bell Bay (3) effluent of the following characteristics:

Again, the experiment demonstrates that extrapolation from the Hallimond tube tests to the larger flotation cell is possible. Although the mechanical parameters such as air flow rate, stirring speed and the means of froth collection assume importance and have not been optimized, the concentration factors are still acceptable and the sludge volume and ease of handling remain impressive.

EXAMPLE 5

Use of other anionic surfactants

Flotation tests were carried out with anionic surfactants other than SDS, under the conditions described in Examples 3 and 4. The pH was maintained at 4.5, [FE] at 100 mg/l and a cationic polymer (Catfloc T) dose of 5 mg/l. The range of surfactants was limited in these tests to the following products of ICI Australia Operations Pty. Ltd:

- Alkanate 3SL3, HLB=38
- Alkanate 3SN5, HLB=38
- Alkanate CS, HLB=11, similar to SDS.

The HLB number refers to the ratio of hydrophilic to lipophilic segments and could be used as a guide to surfactant selection. The ultimate choice will be a compromise between efficiency (as determined by froth concentration, volume and ease of collapsing), toxicity and cost. The results are shown in Table 6.

TABLE 6

| SURFACTANT NAME | CONC. (mg/l) | PRODUCT WATER COLOUR (PCU) | FROTH FRACTION COMMENTS |
|---|---|---|---|
| 3SL3 | 20 | 25 | TOO MUCH FROTH |
|  | 10 | 39 | FLOCS IN PRODUCT WATER |
|  |  | 26 | FLOCS IN PRODUCT WATER |
| 3SN5 | 20 | 16 | TOO MUCH FROTH |
|  | 10 | 50 | FLOCS IN PRODUCT WATER |
| CS | 20 | 24 | CLEAR PRODUCT WATER |
|  | 10 | 37 | FLOCS IN PRODUCT WATER |
| SDS | 20 | 10 | CLEAR PRODUCT WATER |

The more hydrophobic surfactants formed more froth, and transferred the particulate material from the product water. At lower concentrations the froth volumes were reduced but the product water was not as clear indicating that further optimization is possible. The other more hydrophilic surfactant behaved similarly to SDS, requiring a dose of 20 mg/l to be effective.

EXAMPLE 6

Paper and pulp mill effluent

In another series of experiments the effluent treated was of colour 1490 PCU, turbidity 76 NTU and TOC, 241 mg/l. The inorganic coagulant used was ferric chloride, the cationic polymer was a relatively low molecular weight cationic polymer of the DADMAC type, Catfloc T, and the anionic surfactant was Sodium Dodecyl Sulphate (SDS). The results are presented in Table 7.

TABLE 7

| | EXPERIMENTAL CONDITIONS | | | PRODUCT WATER QUALITY | | |
|---|---|---|---|---|---|---|
| pH | [Fe] (mg/l) | [PE] (mg/l) | [SDS] (mg/l) | COLOUR (PCU) | TURB. (NTU) | TOC. (mg/l) |
| 4.8 | 200 | 5 | 30 | 7 | 88 | ND |
| 4.8 | 200 | 5 | 50 | 5 | 56 | 24 |
| 4.7 | 200 | 6 | 50 | 8 | 49 | 25 |
| 4.8 | 250 | 5 | 50 | 5 | 38 | 25 |
| 4.8 | 300 | 5 | 50 | 3 | 67 | 25 |

The results demonstrate the ability of the flotation process to treat another paper and pulp mill effluent, this time with a combination of a cationic polymer or copolymer and an anionic surfactant.

EXAMPLE 7

Paper and pulp mill effluent

Treatment of a different mill effluent with colour 294 PCU, turbidity 141 NTRU and TOC 1395 mg/l, required different set of experimental conditions using a lime slurry at a high pH to concentrate the organics. The data is shown in Table 8.

TABLE 8

| | EXPERIMENTAL CONDITIONS | | | PRODUCT WATER QUALITY | | |
|---|---|---|---|---|---|---|
| pH | COAGU- LANT SLURRY | [PE] (mg/l) | [SDS] (mg/l) | COLOUR (PCU) | TURB. (NTU) | TOC. (mg/l) |
| 12.2 | LIME | 10 | 100 | 85 | 263 | |
| 12.4 | LIME | 15 | 150 | 100 | 173 | |
| 12.3 | LIME | 20 | 200 | 122 | 48 | |

The results demonstrate the versatility of the process in coping with different effluents of vastly different character, but also illustrate the need for preliminary testing to determine the optimum mode or operation. In all of the above experiments the froth volumes were small and the amount of filtered residue from the froth even smaller.

EXAMPLE 8

Flotation of Paper Mill Effluents.

The method described in Example 1 was employed and 100 ml of effluent was used in each experiment. The pH was adjusted as required, and air was bubbled through the liquid for 10 minutes. Fe indicates that Ferriclear was the coagulant and lime indicates the addition of a lime slurry as coagulant. The cationic polymer used was LT31 and the surfactant was sodium dodecyl sulphate (SDS). The results are shown in Table 9.

TABLE 9

| Sample | pH | [coagulant] mg/l | [LT31] mg/l | [SDS] mg/l | Colour | Turbidity | TOC | TOC removal |
|---|---|---|---|---|---|---|---|---|
| feed | 9.39 | | | | 830 | 79 | 207 | |
| 8.1 | 4.37 | 200 Fe | 200 | 100 | 18 | 35 | 52 | 72% |
| feed | 7.44 | | | | 1490 | 76 | 241 | |
| 8.2 | 4.81 | 300 Fe | 5 | 50 | 5 | 38 | 25 | 90% |
| feed | 6.20 | | | | 348 | 141 | 1395 | |
| 8.3 | 12.23 | lime | 10 | 100 | 85 | 263 | 427 | 70% |
| 8.4 | 12.34 | lime | 20 | 200 | 122 | 48 | 435 | 70% |

EXAMPLE 9

Flotation of Wool Scour Effluents

The method described in Example 1 was employed and 100 ml of effluent was used in each experiment. The pH was adjusted as required and air was bubbled through the liquid for 10 minutes. Fe indicates Ferriclear was the coagulant. The cationic polymer was LT22. Wool scour effluents contain significant quantities of anionic surfactants of synthetic or natural origin so that further addition of surfactant was unnecessary. The results are shown in Table 10.

TABLE 10

| Sample | pH | [coagulant] mg/l | [LT22] mg/l | [SDS] mg/l | Colour | Turbidity | COD | COD removal |
| --- | --- | --- | --- | --- | --- | --- | --- | --- |
| feed | 6.86 | | | | | 27,800 | 140,000 | |
| 9.1 | 3.84 | 980 | 600 | 0 | | 300 | 27,500 | 80% |
| feed | 6.91 | | | | | 9,600 | 24,000 | |
| 9.2 | 4.12 | 330 | 200 | 0 | | 800 | 1,500 | 94% |
| feed | 7.60 | | | | | | 107,500 | |
| 9.3 | 3.86 | 1600 | 600 | 0 | 221 | 200 | 5,100 | 95.3% |
| feed | 7.80 | | | | | | 57,000 | |
| 9.4 | 3.56 | 1230 | 60 | 0 | 246 | 33 | 1,940 | 97% |
| feed | 7.60 | | | | | 7600 | 32,600 | 113,000 |
| 9.5 | 4.30 | 10 | 150 | 0 | 2660 | 900 | 15,800 | 86% |
| feed | 5.86 | | | | | 410 | 350 | 15,000 |
| 9.6 | 5.86 | 10 | 50 | 0 | 23 | 20 | 150 | 99% |

EXAMPLE 10

Flotation of Cosmetic Manufacturing Effluents

The method described in Example 1 was employed and 100 ml of effluent was used in each experiment. The pH was adjusted as required and air was bubbled through the liquid for 10 minutes. Fe indicates Ferriclear was the coagulant and lime indicates the addition of a lime slurry as coagulant. The cationic polymer used was CATFLOC T and the surfactant was sodium dodecyl sulphate SDS. The results are shown in Table 11.

TABLE 11

| Sample | pH | [coagulant] mg/l | [CATFLOCT] mg/l | [SDS] mg/l | Colour | Turbidity | COD | COD removal |
| --- | --- | --- | --- | --- | --- | --- | --- | --- |
| feed | 8.14 | | | | 38 | 448 | 60,000 | |
| 10.1 | 4.7 | 200 Fe | 50 | 200 | 10 | 26 | 11,000 | 82% |
| feed | 8.50 | | | | 13 | 9570 | 500,000 | |
| 10.2 | 5.8 | 300 Fe | 100 | | 9 | 36 | 11,000 | 98% |

We claim:

1. An effluent treatment process for an effluent containing organic material comprising the steps of:
   (a) adding a coagulant to said effluent to concentrate said organic material therein into a concentrated organic material;
   (b) pretreating said organic material or treating said concentrated organic material with a mixture of a cationic polymer or copolymer in the presence of an anionic surfactant, a nonionic surfactant or both; and
   (c) separating said concentrated organic material from said effluent after step (a) and step (b) by flotation comprising passing air bubbles through the effluent.

2. The effluent treatment process as claimed in claim 1, wherein said coagulant is selected from the group consisting of alum, lime, a magnesium salt and a ferric salt.

3. The effluent treatment process as claimed in claim 1 or claim 2, wherein said effluent contains an effective amount of at least one of an anionic or a non-ionic surfactant before step (a) to fulfil step (b).

4. The effluent treatment process as claimed in claim 1 or claim 2, wherein said surfactant is added to said effluent undergoing treatment.

5. An effluent treatment process as claimed in claim 1 wherein said cationic polymer or copolymer is selected from the group consisting of poly(diallyl dimethylammonium chloride), polyethyleneimine, polyvinylamine, acrylamide copolymers, acrylic copolymers containing quaternary ammonium groups, poly(vinyl 4-alkylpyridinium) salts, poly(methylene-N,N-dimethylpiperidinium) salts, poly(vinylbenzyltrimethylammonium) salts, polyalkylene polyamines, poly(hydroxyalkylene polyamines) and cationic starch.

6. The effluent treatment process as claimed in claim 1, wherein said anionic surfactant is selected from the group consisting of carboxylates, sulphonates, sulphates and phosphates.

7. The effluent treatment process as claimed in claim 6, wherein said anionic surfactant is selected from the group consisting of polyalkoxycarboxylates, N-acylsarcosinates, acylated protein hydrolysates, alkylbenzenesulphonates, alkylarylenesulphonates, lignosulphonates, naphthalenesulphonates, α-olefin sulphonates, petroleum sulphonates, dialkylsulphosuccinates, amidosulphonates, alkyl sulphates, ethoxylated and sulphated alcohols, ethoxylated and sulphated alkylphenols, sulphated acids, amides or esters, sulphated natural oils, sulphated natural fats and phosphate esters.

8. The effluent treatment process as claimed in claim 1, wherein said nonionic surfactant is an ethoxylate.

* * * * *

UNITED STATES PATENT AND TRADEMARK OFFICE
CERTIFICATE OF CORRECTION

PATENT NO. : 5,308,499

DATED : May 3, 1994

INVENTOR(S) : David R. Dixon and Tiong C. Ha

It is certified that error appears in the above-identified patent and that said Letters Patent is hereby corrected as shown below:

TITLE PAGE:
    In item (22), please delete "May 22, 1991" and insert therefor --May 22, 1990--.

Signed and Sealed this

Seventh Day of February, 1995

*Attest:*

BRUCE LEHMAN

*Attesting Officer*     *Commissioner of Patents and Trademarks*